United States Patent [19]

Iinuma et al.

[11] 4,070,642

[45] Jan. 24, 1978

[54] ULTRASONIC WAVE TRANSMITTING AND RECEIVING APPARATUS

[75] Inventors: Kazuhiro Iinuma; Kinya Takamizawa, both of Yokohama, Japan

[73] Assignee: Tokyo Shibaura Electric Co., Ltd., Kawasaki, Japan

[21] Appl. No.: 699,368

[22] Filed: June 24, 1976

[30] Foreign Application Priority Data

June 24, 1975 Japan .................. 50-78052

[51] Int. Cl.² .................................... G01S 9/66
[52] U.S. Cl. .......................... 340/1 R; 73/620
[58] Field of Search ............... 340/1 R, 3 A, 3 C; 73/67.8 S

[56] References Cited

U.S. PATENT DOCUMENTS 3,295,362  1/1967  Wood et al. ................ 340/1 R
3,693,415  9/1972  Whittington ................ 340/1 R
3,919,683  11/1975 Itamura et al. .............. 340/1 R Primary Examiner—Richard A. Farley
Attorney, Agent, or Firm—Oblon, Fisher, Spivak, McClelland & Maier

[57] ABSTRACT

There are provided a transmitter for transmitting an ultrasonic wave pulse having a definite period toward an object to be examined, a receiver for receiving the ultrasonic wave pulse reflected by the object to produce a corresponding electric signal, a switch for selectively passing the electric signal produced by the receiver, a plurality of delay elements having different delay times and connected to receive the electric signal passing through the switch, and adders for adding the output signals of the delay elements after applying a predetermined weight thereto.

8 Claims, 9 Drawing Figures

ULTRASONIC WAVE TRANSMITTING AND RECEIVING APPARATUS

BACKGROUND OF THE INVENTION

This invention relates to an ultrasonic wave transmitting and receiving apparatus which is constructed such that an auxiliary signal is produced from a received signal of a limited quantity for the purpose of displaying an image having an excellent quality.

An ultrasonic wave tomography is used widely as a means not only for the diagnosis of a patient but also for examining the internal state of a body of materials, for example electrical materials. Thus, for example, an electro-acoustic transducing element 2 is contacted against the surface of a body 1 to be examined for transmitting an ultrasonic wave pulse into the body 1, as shown in FIG. 1. The pulse reflected by a heterogeneous portion 3, such as a defect or a deceased portion, is received by the electro-acoustic transducing element 2. This operation is repeated successively for various portions of the body 1, and the received signals are applied to a cathode ray tube for producing a tomograph of the heterogeneous portion on the screen of the cathode ray tube.

More particularly, the interval $\tau_1$ between the transmission of the ultrasonic wave pulse and the receipt of the reflected pulse by the electro-acoustic transducing element 2 is proportional to the distance $x_1$ between the element 2 and the heterogeneous portion 3 so that the interval $\tau_1$ can be expressed by an equation $\tau_1 = 2x_1/c$, where $c$ represents the sound velocity in the body 1. Accordingly, when an electron beam of a cathode ray oscilloscope is swept at a definite speed along the abscissa, and when the reflected pulse is subjected to a brightness modulation, the points corresponding to the fore and rear edges of the heterogeneous portion 3 will be lighted. Then, when the ultrasonic wave beam is shifted in a direction perpendicular to the direction of the beam and when the electron beam of the cathode ray tube is moved in the vertical direction corresponding to the scanning of the body 1 by the ultrasonic wave beam a tomographic image 5 of the heterogeneous portion 3 will be produced or the screen 4 of the cathode ray tube, thus giving an information regarding the state of the inside of the body 1.

The scanning of the body 1 by the ultrasonic wave beam can be accomplished by a linear scanning method wherein the electro-acoustic transducing element 2 is shifted a definite distance in a direction perpendicular to the beam, or a sector scanning method in which the element 2 is rotated in a sector or by a combination or modification of these methods. With a low scanning speed, since the display system of the conventional cathode ray tube has no memory function, it is not only impossible to directly observe the displayed tomographic image 5 but also to observe moving portions.

Accordingly, in order to decrease the flicker or to enable to observe an object which is moving at a high speed, it is necessary to sufficiently increase the scanning speed.

However, the sound velocity of the ultrasonic wave is not so high so that when the ultrasonic wave beam is transmitted in a given direction and then the beam is transmitted in a different direction after the reflected beam has completely disappeared the repetition period of the ultrasonic wave pulse would be limited thereby making it impossible to use a high speed scanning. Where the period of the ultrasonic pulse is given, the number of scannings per one second is determined. Accordingly, the spacing between the scanning lines or the screen is determined for a given field of view, that is the area of the section to be examined, and a given number of the frames per second. This factor determines the coarseness of the image. Denoting the area of the field by S, the number of the frames per second by N, the spacing between the scanning lines by P and the sound velocity by c, we obtain an equation $P = 2mSN/c$. Assuming that $c = 1500$ m/sec., the relationship between S, N and P will be shown by graphs shown in FIG. 3. In the above equation, $m$ is a coefficient showing that the repetition period of the ultrasonic wave pulse is selected to be longer than the time of arrival of the reflected pulse in the field so as to prevent signals caused by the reflected pulse from a portion more remote from the electro-acoustic transducing element than the field of view, or by multiple reflections from appearing on the scanning lines for displaying an image. In the example shown in FIG. 3, it is assumed that $m = 2$. In other words, in the case of FIG. 3, the transmission of the next ultrasonic wave pulse is delayed by an interval equal to the sum of the interval between the transmission of the ultrasonic wave pulse and the receipt by a pulse reflected from a portion in a region more remote than the field of view, and a time equal to said interval. Usually, $m$ is set about 1. Let us consider an interval in which a signal is displayed in the field of the screen as an effective time, and the time until the next ultrasonic wave pulse is transmitted as an idle time. Then, when the idle time is short, there is a fear that the signal caused by multiple reflection or by the pulse reflected by a remote portion will appear on the scanning line thus forming a false image. On the contrary, too long idle time ($m$ is large) decreases the density of the scanning lines (or the field area or the number of frames) thus making it impossible to observe moving objects. This makes impossible to display with an actual time. Furthermore, where it is desired to simultaneously display a UCG as will be described later, the spacing between the scanning lines of the UCG would be decreased owing to a small number of samplings of the UCG.

SUMMARY OF THE INVENTION

Accordingly, it is an object of this invention to provide a novel ultrasonic wave transmitting and receiving apparatus capable of increasing the density of the scanning lines on a display screen irrespective of the period of the transmission of an ultrasonic wave pulse and producing a dense and flicker free image in an actual time.

According to this invention, there is provided an ultrasonic wave transmitting and receiving apparatus comprising transmitting means including a plurality of electro-acoustic transducing elements for transmitting ultrasonic wave pulses having a definite period toward an object to be examined, receiving means arranged to receive ultrasonic wave pulses reflected by the object through the electro-acoustic transducing elements for producing corresponding electric signals, switch means for selectively passing a predetermined part of the electric signals produced by the receiving means, and a signal converting circuit including a plurality of delay circuits for dividing the electric signals passing through the switch means into a plurality of signals and for applying a predetermined weight of delay times to the divided signals, and means for adding together the outputs from the delay circuits at a predetermined ratio and combination.

DETAILED DESCRIPTION OF THE PREFERRED EMBODIMENTS

Figure 1:
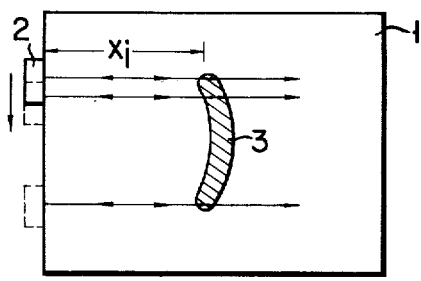
FIG. 1 is a diagram showing the basic arrangement of an ultrasonic wave tomographic apparatus.
Figure 2:
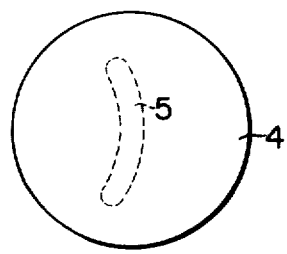
FIG. 2 shows an image of an object displayed on a screen of a cathode ray tube obtained by the apparatus shown in FIG. 1.
Figure 3:
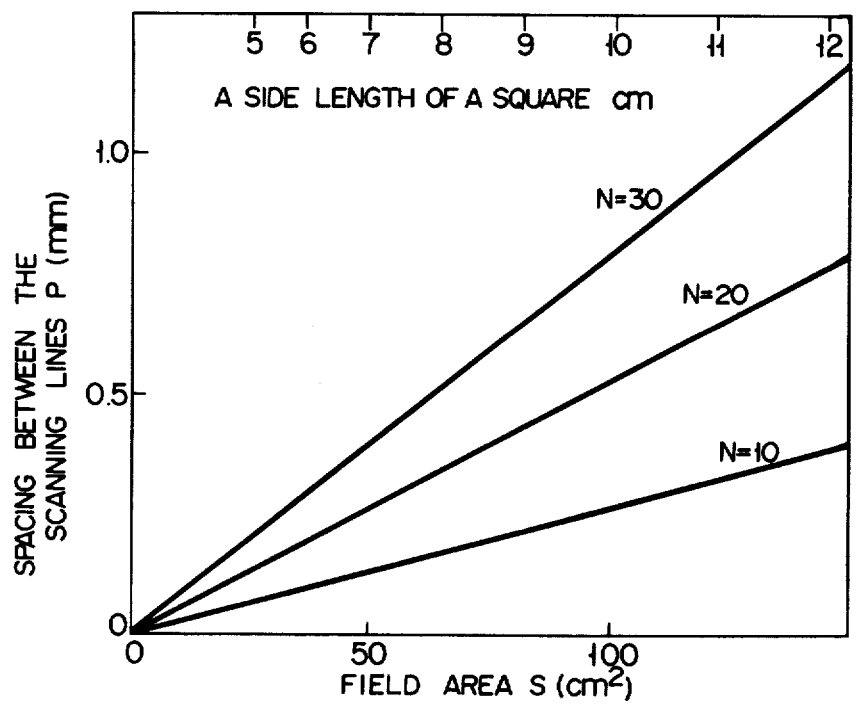
FIG. 3 is a graph showing the relationship between the field area and the spacing between the scanning lines of the apparatus shown in FIG. 1.

The invention will now be described in detail with reference to the embodiments illustrated in the accompanying drawings.

The embodiment of this invention comprises an ultrasonic wave transmitting and receiving unit A and signal converting units $B_1$ and $B_2$ for converting the signal received by the unit A into an output signal.

The ultrasonic wave transmitting and receiving unit A comprises a pulse generator 11 for generating pulses having a predetermined period, a plurality of (for example 64) electro-acoustic transducing elements 12-1, 12-2 ... 12-64 energized by the output from the pulse generator 11 and arranged on the same plane with a spacing of 1.5 mm, for example, and 64 electronic switches 13-1, 13-2 ... 13-64 respectively connected between the pulse generator 11 and the electro-acoustic transducing elements 12-1, 12-2 ... 12-64, a switch control circuit 14 for simultaneously turning ON a plurality of (for example, 8) electronic switches in synchronism with the output pulse from the pulse generator 11 while shifting by one the switches in the direction of their arrangement, thereby successively energizing groups of eight electro-acoustic transducing elements, and a receiver 15 for receiving the reflected ultrasonic wave pulse received by respective electro-acoustic transducing elements 12-1, 12-2 ... 12-64. The output signal from the receiver 15 is applied to the signal converting units $B_1$ and $B_2$ to be described hereunder.

The signal converting unit $B_1$ is constructed such that the output signal from the receiver 15 is applied to three delay elements 17, 18 and 19 through a switch 16a which is turned ON for an interval equal to, for example, ½ of the repetition period $T_0$ of the output pulse from the pulse generator 11. The delay element 17 has a delay time $td = 0$, the delay element 18 has a delay time $td = 1/2T_0$ and the delay element 19 has a delay time $td = T_0$. The output signal $V_1$ from the delay element 17 is added to the signal $V_3$ from the delay element 19 by an adder 20, and one half of the output from the adder 20 is applied to one input of an adder 21, the other input thereof being connected to receive the output signal $V_2$ from the delay element 18. Accordingly, the adder 21 produces an output signal expressed by an equation $V_0 = V_2 + (V_1 + V_3)/2$. Of this output signal, a reflected pulse component is applied to a cathode ray oscilloscope 22 as the brightness modulation signal, while a component of the transmitted pulse P is applied to the oscilloscope as a sweep commencing signal and as a sweep position shifting signal.

Figure 5:
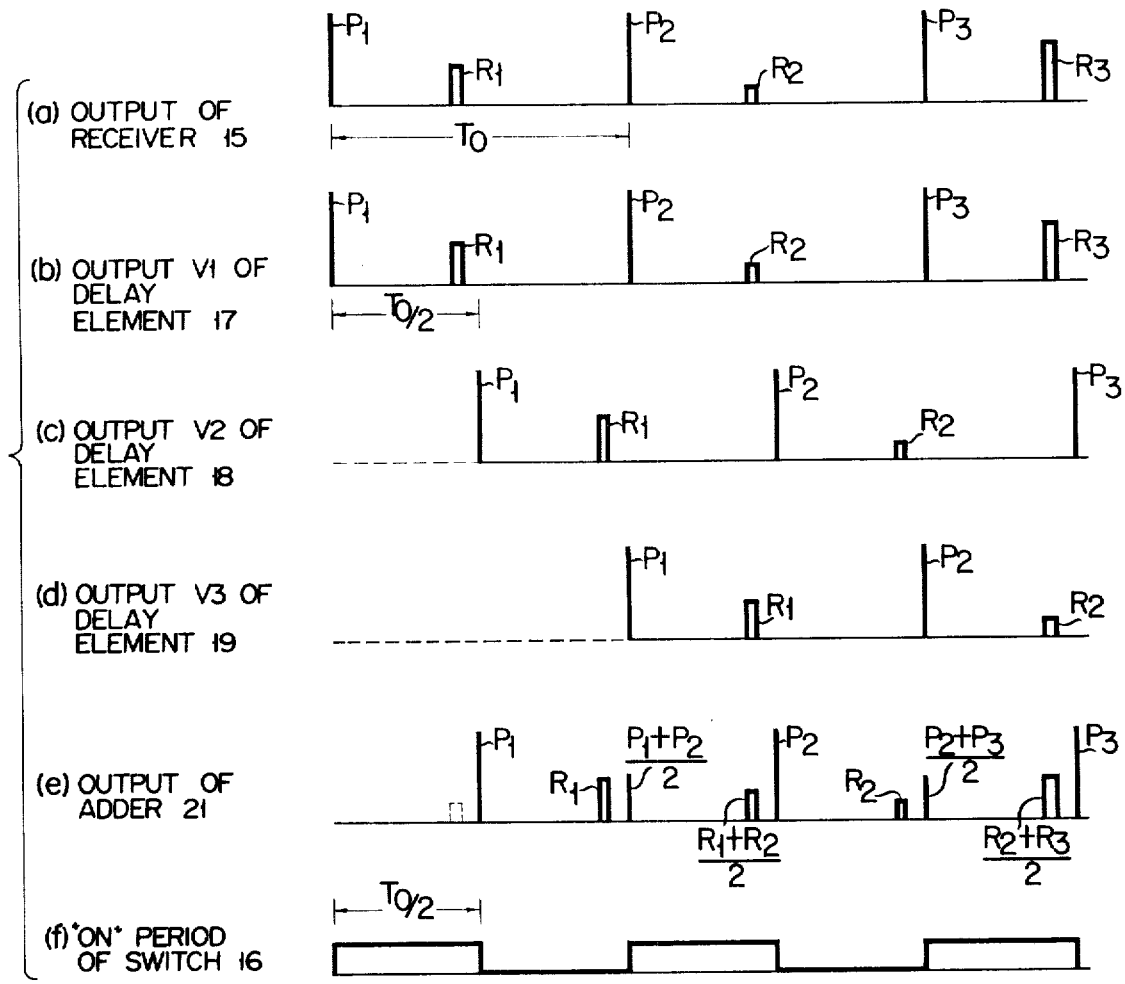
FIG. 5 shows signal waveforms for explaining the operation of the apparatus shown in FIG. 4.

The operation of the apparatus described above will now be described with reference to the signal waveforms shown in FIG. 5.

More particularly, upon starting the pulse generator 11, the pulse generator 11 produces an output pulse having a period $T_0$ which controls the switch control circuit 14 so as to simultaneously energize eight of the electro-acoustic transducing elements 12-1, 12-2 ... 12-64 (eight elements to be energized at a time being successively shifted by one), whereby ultrasonic wave pulses $P_1$, $P_2$, $P_3$ ... are successively transmitted at the period of $T_0$. When a value m ≧ 'is selected for m, the reflected pulse signals $R_1$, $R_2$, $R_3$ ... from the field of view are received during a interval of $T_0/2$ as shown in FIG. 5a. These reflected pulse signals $R_1$, $R_2$, $R_3$ ... are received by the receiver 15 and the output thereof is applied to the signal converting unit $B_1$.

Since the delay times of the delay elements of the signal converting unit $B_1$ are set to 0, $T_0/2$ and $T_0$, respectively, the output signals $V_1$, $V_2$ and $V_3$ from the delay elements 17, 18 and 19 have a phase difference of $T_0/2$ as shown in FIGS. 5b, 5c and 5d. Consequently, the output signal from the adder 21 becomes as is shown by FIG. 5e. In other words, the adder 21 produces reflected pulse signals $R_1$, $R_2$ and $R_3$ and false reflected pulse signals intermediate the reflected pulse signals and having a mean values of the adjacent reflected pulse signals. These reflected pulse signals are used as the brightness modulation signal of the cathode ray oscilloscope 22. As a consequence, in spite of the fact that the ultrasonic wave pulse P are tranmitted at the period of $T_0$, reflected pulse signals are displayed on the screen of the cathode ray oscilloscope 22 as if two ultrasonic wave pulses were transmitted during the period of $T_0$ with the result that the density of the scanning lines is doubled.

In this manner, the reflected pulse signal received by the ultrasonic wave receiving unit A is applied in a parallel fashion to three delay elements 17, 18 and 19 having different delay times, and the outputs of the three delay elements 17 to 19 are applied to the signal converting unit $B_1$ which imparts a predetermined weight to the outputs and then adds them together to produce an output signal which is applied to the cathode ray oscilloscipe 22 to display an image. For this reason, it is possible to substantially decrease the period of the reflected pulse signal while the transmission period $T_0$ of the ultrasonic wave pulse P is maintained at a definite period so that it is possible to efficiently utilize the idle time for display thereby improving either one or all of the field of the veiw, fineness of the picture and the number of frames per second. For example, when the field of view and the fineness of the picture are the same as those of conventional apparatus, flickering can be decreased. On the other hand, where the field of view and the number of the frames per second are the same as those of the conventional apparatus, it is possible to obtain a fine picture. Accordingly, the apparatus of this invention is also effective to observe moving objects with the actual time.

The signal converting unit $B_2$ shown in the embodiment of FIG. 4 and utilized to obtain an ultrasonic cardiogram (UCG) will be described hereunder. A UCG is a graph for displaying the displacement of a specific portion of a moving object with reference to time and is utilized to observe the motion of a given portion of a heart, for example. In order to observe a specific portion of the object in the field of view, it is necessary to apply to the signal converting unit $B_2$ only a signal from a particular one of the electroacoustic transducing elements 12-1, 12-2 . . . 12-64 at the time of linear scanning. This embodiment is constructed such that the number of the output pulses P from the pulse generator 11 is counted by a counter 25 so as to obtain the output from a particular transducing element alone through a transfer switch 16b. Thus, in the embodiment shown in FIG. 4, eight elements of respective groups among 64 electroacoustic transducing elements 12-1 . . . 12-64 (respective groups being successively shifted by one in the direction of arrangement of the elements) are simultaneously energized, so that the number of output pulses required to complete the linear scanning operation from the first group of the elements 12-1 through 12-8 to the last group of the elements 12-57 through 12-64 is 57. Accordingly, when one linear scanning cycle has been completed, the same group of the electroacoustic transducing elements is energized agin at each 58th pulse P. Consequently, the counter 25 is constructed to be a scale of 58 counter for counting 58 output pulses P to generate a carry signal. This carry signal is used to control the transfer switch 16b whereby only the signal from the same group of the elector-acoustic transducing elements is sent to the signal converting unit $B_2$. Similar to the signal converting unit $B_1$, the signal converting unit $B_2$ comprises three delay elements 17a, 18a and 19a, and two adders 20a and 21a. Denoting the time required for one linear scanning cycle by T, then the delay times of the delay elements 17a, 18a and 19a respectively may be expressed by equations $td' = 0$, $td' = \frac{1}{2}T$, and $td' = T$. The output from the adder 21a is applied to suitable display means, for example a cathode ray oscilloscope 22a to display an ultrasonic cardiogram on the screen of the cathode ray oscilloscope 22a. Again, the actually measured data is displayed at a period of T and at a rate of one display for one linear scanning cycle, thereby producing an ultrasonic cardiogram equivalent to an arrangement wherein the measured data is produced by the signal converting unit $B_2$ at a period of T/2.

Although in this example, one UCG is obtained for each scanning period, it is also possible to obtain UCG signals for a particular direction in which a plurality of pulses (for example 8) are transmitted during each scanning cycle by modifying the mode of transferring the electronic switches.

Figure 6:
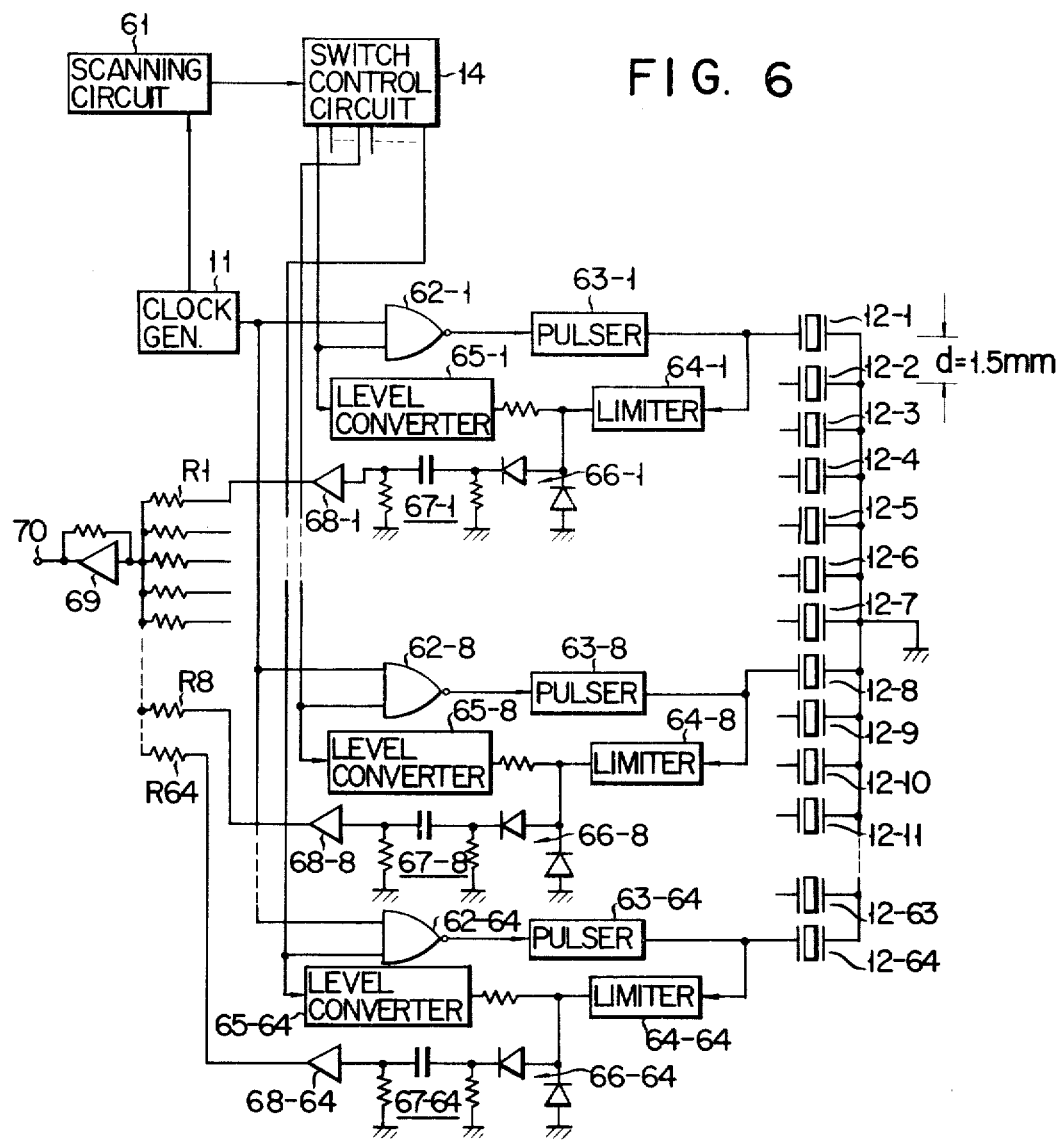
FIG. 6 is a block diagram showing one example of a portion of the apparatus shown in FIG. 4.

A more concrete construction and operation of the electronic switches 13-1 through 13-64 ON-OFF controlled by the switch control circuit 14 shown in FIG. 4 will be described with reference to FIG. 6. When the switch control circuit 14 is driven by the output of the clock generator 11 via a scanning circuit 61, the first clock pulse is applied to one inputs of NAND gate circuits 62-1 through 62-8 from the clock generator 11. The other inputs of the NAND gate circuits 62-1 through 62-8 are connected to receive the gate signals from the first to eighth output terminals of the switch control circuit 14 driven by the output from the scanning circuit 61. Consequently, the first clock pulse energizes the electro-acoustic transducing elements 12-1 through 12-8 via the NAND gate circuits 62-1 through 62-8 and pulsers 63-1 through 63-8. As a consequence, the ultrasonic wave beam radiated by the elements 12-1 through 12-8 propagates in the direction of these elements and then received by respective elements after being reflected by an object to be examined. The ultrasonic wave beams received by the electroacoustic transducing elements 12-1 through 12-8 are converted into electric signals which are applied to limiters 64-1 through 64-8. The purpose of the limiters 64-1 through 64-64 is to prevent an excessively large input from being directly applied to the receiver 15. The electric signals passing through the limiters 64-1 through 64-8 are applied to capacitor coupling circuits 67-1 through 67-8 through switching diodes 66-1 through 66-8 which are ON-OFF controlled by the output from the level converters 65-1 through 65-8 which are driven by the output from the switch control circuit 14. The outputs from the capacitor coupling circuits 67-1 through 67-8 are amplified by amplifiers 68-1 through 68-8 and then synthesized by a synchesizing circuit constituted by a plurality of resistors $R_1$ through $R_8$. The output from the synthesizing circuit is amplified by an operational amplifier 69 and supplied to an output terminal 70 which is connected to the signal receiving terminal of the receiver 15 shown in FIG. 4.

The second output pulse from the clock generator 11 drives the scanning circuit 61 and the switch control circuit 14 so that the gate signals from the second to ninth output terminals of the switch control circuit 14 are applied to one inputs of the NAND gate circuits 62-2 through 62-9 at the same time when the second output pulse from the clock generator 11 is applied to the other inputs of the NAND gate circuits 62-1 through 62-64. In this manner, the second clock pulse actuates second to nineth electro-acoustic transducing elements 12-2 through 12-9 thereby radiating ultrasonic wave beams toward the front sides thereof. The beams reflected by an object to be observed are received by the electro-acoustic transducing elements 12-2 through 12-9 and the outputs of these elements are applied to the receiver 15 in the same manner as above described. The output from the switch control circuit 14 controls NAND gate circuits 62-1 through 62-64 whereby the operation described above is repeated until the last group of the electro-acoustic transducing elements 12-57 through 12-64 transmits the ultrasonic wave pulses while the elements in respective groups are shifted one by one in the direction of arrangement of the elements. Above description describes one scanning cycle in which the elements of the groups of a plurality of electro-acoustic transducing elements are shifted one by one in the direction of the arrangement thereof. Such linear scanning cycle is repeated cyclically to obtain an ultrasonic tomographic image as well as an ultrasonic cardiogram.

Of course it is possible to vary the number of the UCG signal per one scanning cycle to any number, for example 8, by varying the manner of control provided by the scanning circuit 61. This can be accomplished by turning ON a specific switch at each eighth clock pulse.

Figure 4:
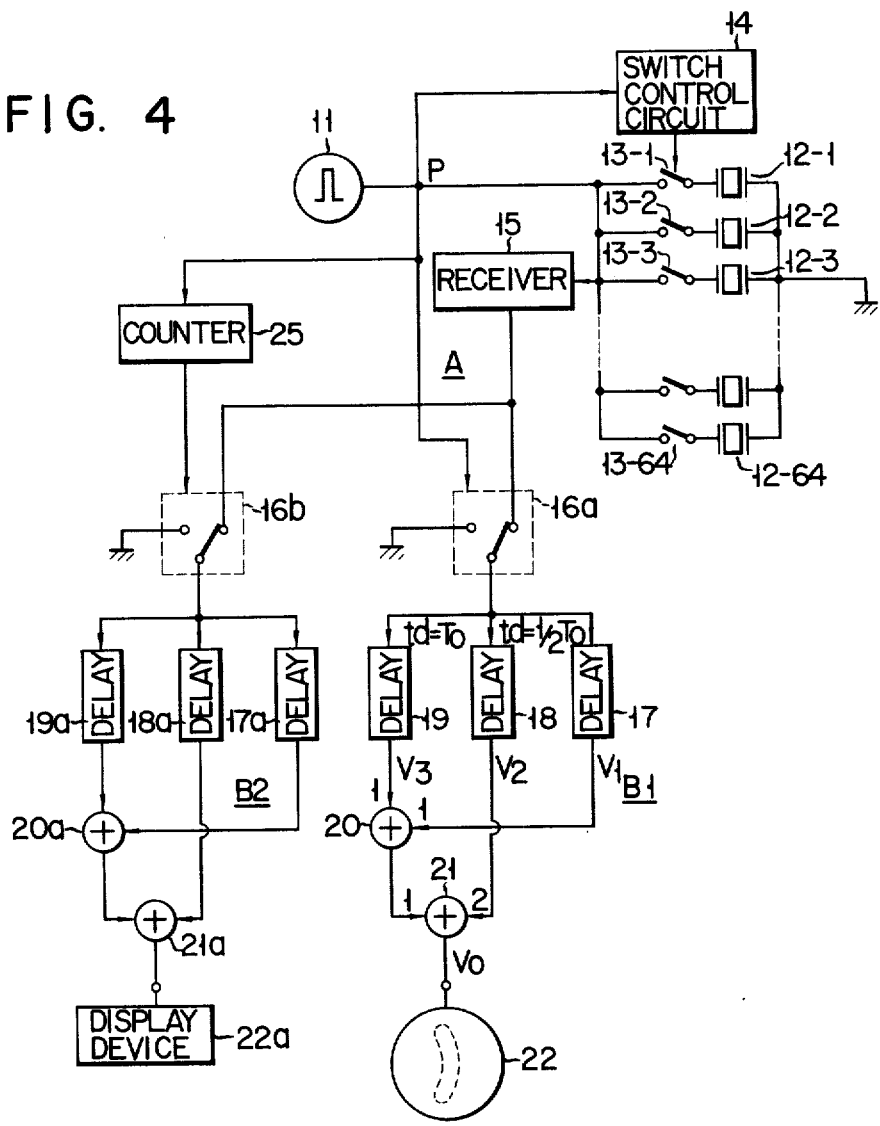
FIG. 4 is a block diagram showing one embodiment of the ultrasonic wave transmitting and receiving apparatus of this invention.
Figure 7:
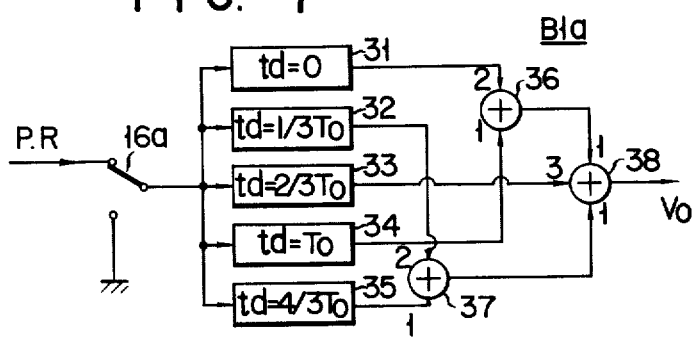
FIG. 7 is a block diagram showing another example of the signal converter of the apparatus shown in FIG. 4.
Figure 8:
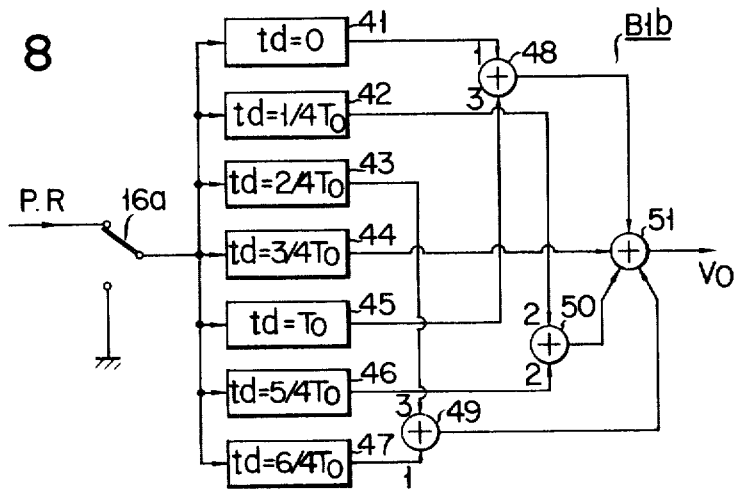
FIG. 8 is a block diagram showing still another example of the signal converter.
Figure 9:
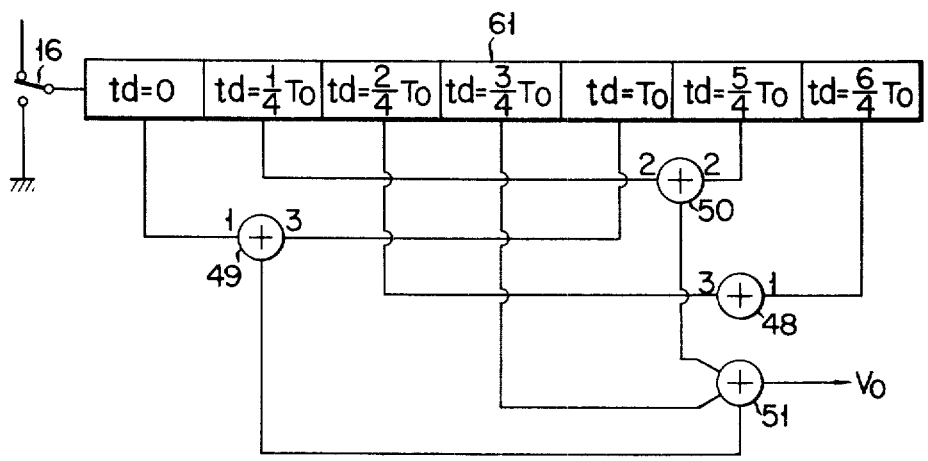
FIG. 9 is a block diagram showing yet another example of the signal converter.

FIG. 4 shows an example wherein $m \geq 2$ but in the case wherein $m \geq 3$ a signal converting unit B1a is constructed as shown in FIG. 7. Thus, a reflected pulse signal applied through switch 16a is applied in parallel upon five delay elements 31 through 35 respectively having delay times of $td = 0$, $td = \frac{1}{3}T_0$, $td = \frac{2}{3}T_0$, $td = T_0$ and $td = 4/3T_0$ and the outputs from the delay elements 31 and 34 are added with each other at a level ratio of 2:1 by an adder 36, while the outputs from delay elements 32 and 35 are added with each other at a level ratio of 2:1 by an adder 37. The outputs from adders 37 and 36 and the output from delay element 33 are added together at a level ratio of 1:1:3 by an adder 38 to produce an output. In the case wherein $m \geq 5$ a signal converting unit B1b is constituted by seven delay elements 41 through 47 having delay times different by $\frac{1}{4}T_0$ respectively and four adders 48, 49, 50 and 51 which are connected as shown in FIG. 8. As can be noted from FIGS. 7 and 8, where $m \geq x$, wherein $x$ represents an arbitrary integer, it is necessary to provide $(2 \times -1)$ delay elements having a delay time differences of $T_0/x$ with each other. Among the delay times there is a zero delay time ($td = 0$). For this reason, a single delay line may be used having (2N−1) taps spaced from each other by $T_0/N$, where N is an integer. FIG. 9 shows a case wherein $N = 4$.

If a time compression circuit, not shown, is interposed between the switch 16a and a group of the delay elements it is possible to further increase the number of the scanning lines even when $m$ is equal to 1. For example, when the time corresponding to the area of the view field is compressed to $\frac{1}{3}$ it is possible to make the effective time to be equal to $T_0/3$, and the idle time to be equal to $2T_0/3$ by utilizing a signal compressed during the $\frac{1}{3}$ interval thus making the apparent value of $m$ to be equal to 3. Accordingly, when a value of $m \geq 1$ is selected, the effective time is compressed to $\frac{1}{3}$ and the output thereof is applied to the group of the delay elements shown in FIG. 7 so that it is possible to increase the number (density) of the scanning lines by a factor of 3. In the case of the signal converting unit B$_2$ shown in FIG. 4 and utilized to obtain an ultrasonic cardiogram since the idle time is sufficiently longer than the effective time, it is easy to increase the number of the scanning lines by a factor of 4 or more without using a time compression circuit.

As has been described hereinabove, as it is possible to efficiently utilize an idle time essential to the apparatus for producing equivalent received wave signal during the idle time it is possible to improve the metter of the field of view and resolution and to increase the number of frames per unit time thereby enabling to produce a real time image free from flickering. Further, although the foregoing description is made in terms of a linear scanning system it will be clear that the invention is also applicable to a sector type scanning system in which the direction of the scanning beam is rotated in a sector.

What we claim is:

1. An ultrasonic wave transmitting and receiving apparatus comprising transmitting means including a plurality of electro-acoustic transducing elements for transmitting ultrasonic wave pulses having a definite period toward an object to be examined, receiving means arranged to receive ultrasonic wave pulses reflected by said object through said electro-acoustic transducing elements for producing corresponding electric signals, switch means having an ON-OFF state including a switch control means for controlling the ON-OFF state of the switch means for selectively passing a predetermined part of said electric signals produced by said receiving means, and a signal converting circuit including a plurality of delay circuits for dividing the electric signals passing through said switch means into a plurality of signals and for applying a predetermined weight of delay times to said divided signals and means for adding together the outputs from said delay circuits at a predetermined ratio and combination.

2. The ultrasonic wave transmitting and receiving apparatus according to claim 1 wherein said means for transmitting the ultrasonic wave pulses comprises a clock pulse generator for producing clock pulses having a definite period, a switch control circuit controlled by said clock pulse, an NAND gate circuit enabled by the output from said switch control circuit for passing said clock pulse, a pulser supplied with the output from said NAND gate circuit and a plurality of electro-acoustic transducing elements arranged on a line at an equal spacing and energized by the output from said pulser.

3. The ultrasonic wave transmitting and receiving apparatus according to claim 1 wherein said receiving means comprises a plurality of limiters connected to receive the signals reproduced by said electro-acoustic transducing elements for preventing excessively large inputs, diode switch circuits respectively supplied with the outputs from said limiters, a level converter for controlling ON-OFF operations of said diode switch circuits, amplifiers for amplifying signals passing through said diode switch circuits, a resistance synthesizing circuit for synthesizing the outputs of said amplifiers, and a receiver connected to receive the output from said resistance synthesizing circuit.

4. The ultrasonic wave transmitting and receiving apparatus according to claim 1 wherein said signal converting circuit comprises a first delay element that delays said electric signal for an interval corresponding to the period of said ultrasonic wave pulse, a second delay element that delays said electric signal for an interval equal to one half of said pulse period, a third delay element having a zero delay time, a first addition circuit for adding the output signals from said first and third delay circuits at a level ratio of 1:1, and a second addition circuit for adding the output signal from said first addition circuit and the output signal from said second delay element at a level ratio of 1:2.

5. The ultrasonic wave transmitting and receiving apparatus according to claim 1 wherein said signal converting circuit comprises a first delay element having a zero delay time, a second delay element that delays said electric signal for an interval corresponding to $\frac{1}{3}$ of the period of said ultrasonic wave pulse, a third delay element that delays said electric signal for an interval equal to $\frac{2}{3}$ of said pulse period, a fourth delay element that delays said electric signal for an interval equal to said pulse period, a fifth delay element that delays said electric signal for an interval equal to 4/3 of said pulse period, a first addition circuit for adding the outputs from said first and fourth delay circuits at a level ratio of 2:1, a second addition circuit for adding the output signals from said second and fifth delay elements at a level ratio of 2:1, and a third addition circuit for adding the output signals from said first and second addition circuits and the output signal from said third delay element at a level ratio of 1:1:3.

6. The ultrasonic wave transmitting and receiving apparatus according to claim 1 wherein said signal converting circuit comprises a first delay element having a zero delay time, a second delay element that delays said received electric signal for an interval equal to $\frac{1}{4}$ of the period of said ultrasonic wave pulse, a third delay element that delays said electric signal for an interval equal to 2/4 of said pulse period, a fourth delay element that delays said electric signal for an interval equal to ¾ of said pulse period, a fifth delay element that delays said electric signal for an interval equal to said pulse period, a sixth delay element that delays said electric signal for an interval equal to 5/4 of said pulse period, a seventh delay circuit that delays said electric signal for an interval equal to 6/4 of said pulse period, a first addition circuit for adding the output signals from said first and fifth delay elements at a level ratio of 1:3, a second addition circuit for adding the output signals from said second and sixth delay elements at a level ratio of 2:2, a third addition circuit for adding the output signals from said third and seventh delay elements at a level ratio of 3:1, and a fourth addition circuit for adding the output signals from said first, second and third addition circuits and the output signal from said fourth delay element.

7. The ultrasonic wave transmitting and receiving apparatus according to claim 1 wherein the delay circuit of said signal converting circuit comprises a single delay line having $(2N-2)$ taps at a time delay spacing of $T_0/N$ where $T_0$ represents the period of the ultrasonic wave pulse or a scanning period, and N an integer.

8. The ultrasonic wave transmitting and receiving apparatus according to claim 1 wherein said transmitting means comprises a clock pulse generator for energizing said electro-acoustic transducing elements, said receiving means comprises a counter which counts the number of clock pulses for producing a carry signal each time it counts a predetermined number of the clock pulses, said switch means comprises a first transfer switch for passing said electric signal for an interval corresponding to the traveling time of the ultrasonic wave in the view field and a second transfer switch for passing said electric signal only when said carry signal is produced by said counter, and said signal converting circuit comprises a first signal converting unit for receiving an electric signal passing through said first transfer switch and a second signal converting unit for receiving an electric signal passing through said second transfer switch.

* * * * *